:::
United States Patent Office 3,179,809
Patented Apr. 20, 1965

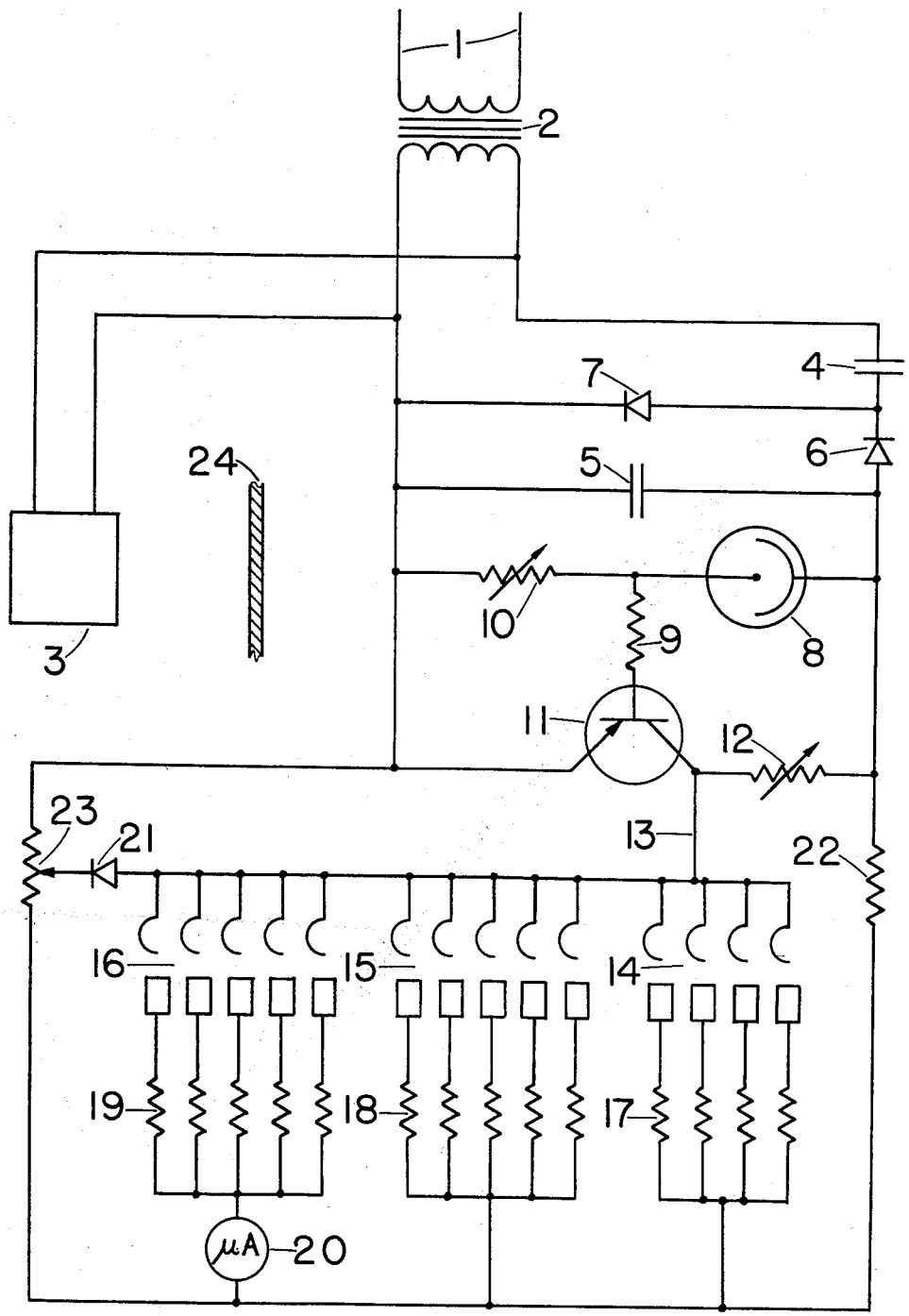

3,179,809
CONTACT PRINT TRANSLUCENCY METERS
Ronald M. Sundelin, 549 S. Braddock Ave.,
Pittsburgh, Pa.
Filed Feb. 23, 1961, Ser. No. 91,214
12 Claims. (Cl. 250—214)

This invention pertains to the determination of proper operating speeds for contact print machines, or the like, of which blueprint and white print machines are examples. For a particular machine, there are three factors which dictate the proper operating speeds. These factors are: (1) the translucency of the item from which the print is to be made; (2) the type of print material being used; (3) the intensity of the lines and characters appearing on the item from which the print is to be made.

The wavelength involved in making contact prints is generally outside the visible spectrum, so that the contact print machine operator is unable to judge the effective translucency of the item from which the print is to be made. Considerable waste of operator time and print material results from this inability to judge translucency. The measurement of translucencies of thin sheets such as those from which contact prints are to be made is a well established art. However, it is desirable that the translucency meter read directly in terms of the proper machine speed. This invention is an improvement in translucency meters which takes into account the three speed-dictating factors enumerated above, and provides readings directly in terms of the proper machine speeds.

The contact print machine operator can easily judge the intensity of the lines and characters on the item from which the contact print is to be made. From this intensity, the operator can select the print background intensity which will yield the most satisfactory contrast on the print between the background and the lines and characters. A selector mechanism is provided by the invention for taking the desired background intensity into account in the determination of the proper speed for the contact print machine. Another selector mechanism is provided by the invention for taking the type of print material to be used into account in the determination of the proper speed for the contact print machine. The invention also provides a means for the measurement of the translucency of the item from which the contact print is to be made. The translucency, together with the desired background intensity and the type of print material to be used, is taken into account by the invention to yield a direct reading of the proper speed setting for the contact print machine. Instead of yielding a machine speed reading, the invention can also control the contact print machine directly if a machine speed control mechanism be substituted for the meter.

In the form of the invention shown in the drawing, a pair 1 of leads is provided for connection to a source of alternating current. The leads 1 are also connected to a voltage-stabilizing transformer 2. The stabilized voltage is delivered to an electromagnetic radiation source 3 and to a voltage doubler and rectifier consisting of the capacitors 4 and 5 and of the diodes 6 and 7. The rectified voltage is applied to a photocell 8. The photocell 8 receives current through the variable resistor 10 and through the resistor 9 and transistor 11. Together, the resistor 9 and variable resistor 10 provide means of calibrating the circuit. The transistor 11 amplifies the current passing through the resistor 9. The variable resistor 12 permits compensation for the current emitted by the transistor 11 when no radiation is striking the photocell 8. Current from the transistor 11 is delivered through the lead 13 to three selector switches, 14, 15, and 16. The switches 14, 15, and 16 deliver currents to one conductance each of the groups 17, 18, and 19, respectively, of conductances. The switches 15 and 16 may be combined into a single unit for ease of operation. The current passing through the group 19 of conductances passes through the meter 20, unless the current is above the maximum desired meter current, in which case the excess current passes through the diode 21. The resistor 22 and the potentiometer 23 together form a voltage division network. Means are provided for interposing between the electromagnetic radiation source 3 and the photocell 8 an item 24 from which a contact print is to be made.

The principles of operation of the invention are as follows. The contact print material is initially coated with a number $N_0$ per unit area of sensitive molecules whose probability of decomposition or transmutation per unit time and per unit incident radiation intensity is $s$. The intensity reaching the photocell from the electromagnetic radiation source when the path is unobstructed will be denoted by $I$. The ratio of transmitted radiation to radiation incident upon the item from which a contact print is to be made will be denoted by $x$. Time will be denoted by $t$. The number of sensitive molecules present at any given time per unit area on the contact print material will be denoted by $N$. There results the differential equation $dN = -NIxsdt$, which, when solved, yields $t = -1/(Ixs) \log_e N/N_0$. If the machine speed is denoted by $v$, and distance by $L$, $v = L/t = LIsx/\log_e (N_0/N)$. For a given type of sensitized material, there will be a small range of desirable ratios of $N_0/N$ on the background, depending upon the background intensity desired on the print.

In the contact print translucency meter, the phototube may be regarded as a current source, the current produced being proportional to the incident intensity, which is proportional to $x$ when an item from which a contact print is to be made is interposed between the electromagnetic radiation source and the photocell. By the use of two parallel conductances, $G_1$ and $G_4$, the current $i_1$ through $G_1$ and a series microammeter may be made proportional to the product of the variables $s$ and $(\log_e N_0/N)^{-1}$ by selecting $G_1/(G_1+G_4)$ proportional to $s/\log_e (N_0/N)$. $G_4$ is to be composed of two parallel conductances, $G_2$ and $G_3$. With reference to the drawing, $G_1$, $G_2$, and $G_3$ correspond to one each of the conductances of the groups 19, 18, and 17, respectively, or conductances. Normally, $G_1$ and $G_2$ will be controlled by the same selector switch; that is, the selector mechanisms 15 and 16 will be operated as a unit. $G_3$ is to be varied over a small number of neighboring values of conductances; the purpose of varying $G_3$ is to provide adjustable background intensities on contact prints. A variable conductance may alternatively be used for $G_3$. In the special case that only one value of $G_3$ is to be used, which is the case if only one background intensity is to be provided, such value of $G_3$ may arbitrarily be chosen to be zero, and the elements 14 and 17 are thereby eliminated from the circuit. In this case, $G_2$ may also be made constant, thereby eliminating the selector switch 15 and reducing the group 18 of conductances to a single conductance.

Let two different values of $G_3$ be designated by $G_{3,0}$ and $G_{3,1}$, and let two different values of current through the meter 20 be designated by $i_{1,0}$ and $i_{1,1}$. Let the current through the lead 13 be designated by $i$.

$$i_{1,0} = iG_1/(G_1+G_2+G_{3,0})$$
$$i_{1,1} = iG_1/(G_1+G_2+G_{3,1})$$

Define $a$ and $b$ by $a = i_{1,1}/i_{1,0}$ and $b = G_{3,1}/G_{3,0}$. $a$ is the desired shift in $i_{1,0}$, expressed as a multiplicative factor, and $b$ is the shift in $G_3$ necessary to produce this shift in $i_{1,0}$. By the selection of convenient values for $b$ and $G_{3,0}$, values of $G_1$, $G_2$, and $a$ can be found which will provide means of expressing sensitivity of contact print materials, transmission of items from which contact prints are to be made, and $N_0/N$ in terms of the meter current. The following equations apply.

$$G_1 = \frac{i_{1,0}}{i} \frac{(a-ab)}{(a-1)} G_{3,0} \text{ and } G_2 = \frac{1-ab}{a-1} G_{3,0} - \frac{i_{1,0}}{i} \frac{(a-ab)}{(a-1)} G_{3,0}$$

The values of $a$ are determined empirically. The invention, through the use of the above equations and the above described circuit, provides means for determining the most satisfactory speed for a contact print machine for any given type of print material, background intensity desired on the print, and translucency of the item from which the print is to be made.

I claim:

1. An apparatus for determining suitable operating speeds for contact print machines, comprising a source of light, a photocell, the output current of which is a linear function of the intensity of light incident upon it, means for interposing an item from which a contact print is to be made between said source of light and said photocell, an amplifier, the output current of which is a linear function of the input current, a lead causing the output current of said photocell to flow into the input of said amplifier, three conductances, connected in parallel, leads causing the output current of said amplifier to pass through said conductances, means for changing two of the conductances when the type of contact print material to be used is changed, and means for changing the third conductance when the background intensity desired on the contact print is changed; said conductances are of such values as to cause the current, flowing through one of the said conductances which is changed when the type of contact print material to be used is changed, to be a constant times the proper operating speed for a contact print machine, when an item from which a contact print is to be made is interposed between said source of light and said photocell; said constant is independent of the type of contact print material to be used, of the desired contact print background intensity, and of the translucency of the item from which a contact print is to be made.

2. An apparatus for determining suitable operating speeds for contact print machines, comprising a source of light, a photocell, the output current of which is an essentially linear function of the intensity of light incident upon it, means for interposing an item from which a contact print is to be made between said source of light and said photocell, an amplifier, the output current of which is an essentially linear function of the input current, a lead causing a fraction of the output current of said photocell to flow into the input of said amplifier, three conductances, connected in parallel, leads causing currents which are essentially linear functions of the current flowing through the photocell to flow through said conductances, means for changing two of the conductances when the type of contact print material to be used is changed, and means for changing the third conductance when the background intensity desired on the contact print is changed; said conductances are of such values as to cause the current, flowing through one of the said conductances which is changed when the type of contact print material to be used is changed, to be a constant times a suitable operating speed for a contact print machine, when an item from which a contact print is to be made is interposed between said source of light and said photocell; said constant is independent of the type of contact print material to be used, of the desired contact print background intensity, and of the translucency of the item from which a contact print is to be made.

3. An apparatus for determining suitable operating speeds for contact print machines, comprising a source of light, a photocell, the output current of which is a linear function of the intensity of light incident upon it, means for interposing an item from which a contact print is to be made between said source of light and said photocell, an amplifier, the electrical output signal of which is a linear function of the input signal, a lead causing the output current of said photocell to flow into the input of said amplifier, three conductances, leads causing the output current of said amplifier to pass through said conductances, means for changing two of the conductances when the type of contact print material to be used is changed, and means for changing the third conductance when the background intensity desired on the contact print is changed; said conductances are of such values as to cause the electrical signal, present at one of the said conductances which is changed when the type of contact print material to be used is changed, to be a constant times the proper operating speed for a contact print machine, when an item from which a contact print is to be made is interposed between said source of light and said photocell; said constant is independent of the type of contact print material to be used, of the desired contact print background intensity, and of the translucency of the item from which a contact print is to be made.

4. An apparatus for determining suitable operating speeds for contact print machines, comprising a source of light, a photocell, the output current of which is an essentially linear function of the intensity of light incident upon it, means for interposing an item from which a contact print is to be made between said source of light and said photocell, an amplifier, the electrical output signal of which is an essentially linear function of the input current, a lead causing a fraction of the output current of said photocell to flow into the input of said amplifier, three conductances, leads causing currents which are essentially linear functions of the current flowing through the photocell to flow through said conductances, means for changing two of the conductances when the type of contact print material to be used is changed, and means for changing the third conductance when the background intensity desired on the contact print is changed; said conductances are of such values as to cause the electrical signal, present at one of the said conductances which is changed when the type of contact print material to be used is changed, to be a constant times a suitable operating speed for a contact print machine, when an item from which a contact print is to be made is interposed between said source of light and said photocell; said constant is independent of the type of contact print material to be used, of the desired contact print background intensity, and of the translucency of the item from which a contact print is to be made.

5. An apparatus for determining suitable operating speeds for contact print machines, comprising a source of light, a photocell, the output current of which is a linear function of the intensity of light incident upon it, means for interposing an item from which a contact print is to be made between said source of light and said photocell, an amplifier, the output current of which is a linear function of the input current, a lead causing the output current of said photocell to flow into the input of said amplifier, two conductances, connected in parallel, leads causing the output current of said amplifier to pass through said conductances, and means for changing one of the conductances when the type of contact print material to be used is changed; said conductances are of such values as to cause the current, flowing through the said conductance which is changed when the type of contact print material to be used is changed, to be a constant times the contact print machine operating speed which will yield a contact print of fixed background intensity, when an item from which a contact print is to be made is interposed between said source of light and said photocell; said constant is independent of the type of contact print material to be used and of the translucency of the item from which a contact print is to be made.

6. An apparatus for determining suitable operating speeds for contact print machines, comprising a source of light, a photocell, the output current of which is an essentially linear function of the intensity of light incident upon it, means for interposing an item from which a contact print is to be made between said source of light and said photocell, an amplifier, the output current of which is an essentially linear function of the input current, a lead causing a fraction of the output current of said photocell to flow into the input of said amplifier, at least two conductances, connected in parallel, leads causing currents which are essentially linear functions of the current flowing through the photocell to flow through said conductances, and means for changing at least one of the conductances when the type of contact print material to be used is changed; said conductances are of such values as to cause the current, flowing through one of the said conductances which is changed when the type of contact print material to be used is changed, to be a constant times the contact print machine operating speed which will yield a contact print of fixed background intensity, when an item from which a contact print is to be made is interposed between said source of light and said photocell; said constant is independent of the type of contact print material to be used, and of the translucency of the item from which a contact print is to be made.

7. An apparatus for determining suitable operating speeds for contact print machines, comprising a source of light, a photocell, the output current of which is a linear function of the intensity of light incident upon it, means for interposing an item from which a contact print is to be made between said source of light and said photocell, an amplifier, the electrical output signal of which is a linear function of the input signal, a lead causing the output current of said photocell to flow into the input of said amplifier, at least two conductances, leads causing the output current of said amplifier to pass through said conductances, and means for changing at least one of the conductances when the type of contact print material to be used is changed; said conductances are of such values as to cause the electrical signal, present at one of the said conductances which is changed when the type of contact print material to be used is changed, to be a constant times a suitable operating speed for a contact print machine, when an item from which a contact print is to be made is interposed between said source of light and said photocell; said constant is independent of the type of contact print material to be used, and of the translucency of the item from which a contact print is to be made.

8. An apparatus for determining suitable operating speeds for contact print machines, comprising a source of light, a photocell, the output current of which is an essentially linear function of the intensity of light incident upon it, means for interposing an item from which a contact print is to be made between said source of light and said photocell, an amplifier, the electrical output signal of which is an essentially linear function of the input current, a lead causing a fraction of the output current of said photocell to flow into the input of said amplifier, at least two conductances, leads causing currents which are essentially linear functions of the current flowing through the photocell to flow through said conductances, and means for changing at least one of the conductances when the type of contact print material to be used is changed; said conductances are of such values as to cause the electrical signal, present at one of the said conductances, to be a constant times a suitable operating speed for a contact print machine, when an item from which a contact print is to be made is interposed between said source of light and said photocell; said constant is independent of the type of contact print material to be used, and of the translucency of the item from which a contact print is to be made.

9. An apparatus for determining suitable operating speeds for contact print machines, comprising a source of light, a photocell, the output current of which is an essentially linear function of the intensity of light incident upon it, means for interposing an item from which a contact print is to be made between said source of light and said photocell, at least three conductances, connected in parallel, leads causing currents which are linear functions of the current flowing through the photocell to flow through said conductances, means for changing at least two of the conductances when the type of contact print material to be used is changed, and means for changing at least one other conductance when the background intensity desired on the contact print is changed; said conductances are of such values as to cause the current, flowing through one of the said conductances which is changed when the type of contact print material to be used is changed, to be a constant times a suitable operating speed for a contact print machine, when an item from which a contact print is to be made is interposed between said source of light and said photocell; said constant is independent of the type of contact print material to be used, of the desired contact print background intensity, and of the translucency of the item from which a contact print is to be made.

10. An apparatus for determining suitable operating speeds for contact print machines, comprising a source of light, a photocell, the output current of which is an essentially linear function of the intensity of light incident upon it, means for interposing an item from which a contact print is to be made between said source of light and said photocell, at least three conductances, leads causing currents which are linear functions of the current flowing through the photocell to flow through said conductances, means for changing at least two of the conductances when the type of contact print material to be used is changed, and means for changing at least one other conductance when the background intensity desired on the contact print is changed; said conductances are of such values as to cause the electrical signal, present on one of the said conductances which is changed when the type of contact print material to be used is changed, to be a constant times a suitable operating speed for a contact print machine, when an item from which a contact print is to be made is interposed between said source of light and said photocell; said constant is independent of the type of contact print material to be used, of the desired contact print background intensity, and of the translucency of the item from which a contact print is to be made.

11. An apparatus for determining suitable operating speeds for contact print machines, comprising a source of light, a photocell, the output current of which is an essentially linear function of the intensity of light incident upon it, means for interposing an item from which a contact print is to be made between said source of light and said photocell, at least two conductances, connected in parallel, leads causing currents which are linear functions of the current flowing through the photocell to flow through said conductances, and means for changing at least one of the conductances when the type of contact print material to be used is changed; said conductances are of such values as to cause the current, flowing through one of the said conductances which is changed when the type of contact print material to be used is changed, to be a constant times a contact print machine operating speed which will yield a contact print of fixed background intensity, when an item from which a contact print is to be made is interposed between said source of light and said photocell; said constant is independent of the type of contact print material to be used, and of the translucency of the item from which a contact print is to be made.

12. An apparatus for determining suitable operating speeds for contact print machines, comprising a source of light, a photocell, the output current of which is an essentially linear function of the intensity of light incident upon it, means for interposing an item from which a contact print is to be made between said source of light and said photocell, at least two conductances, leads causing currents which are linear functions of the current flowing through the photocell to flow through said conductances, and means for changing at least one of the conductances when the type of contact print material to be used is changed; said conductances are of such values as to cause the electrical signal, present on one of the said conductances, to be a constant times a suitable operating speed for a contact print machine, when an item from which a contact print is to be made is interposed between said source of light and said photocell; said constant is independent of the type of contact print material to be used, and of the translucency of the item from which a contact print is to be made.

References Cited by the Examiner
UNITED STATES PATENTS

| | | | |
|---|---|---|---|
| 2,243,047 | 5/41 | Foster et al. | 95—75 X |
| 2,517,330 | 8/50 | Marenholtz | 250—219 X |
| 2,753,459 | 7/56 | Fedorchak | 250—83.3 X |
| 2,773,414 | 12/56 | Green | 250—219 X |
| 2,898,800 | 8/59 | Bergson | 250—83.3 X |

RALPH G. NILSON, *Primary Examiner.*

ARCHIE R. BORCHELT, *Examiner.*